United States Patent
Padwekar et al.

(10) Patent No.: US 6,571,359 B1
(45) Date of Patent: May 27, 2003

(54) SYSTEMS AND METHODS FOR TESTING PROCESSORS

(75) Inventors: Kiran A. Padwekar, Santa Clara, CA (US); Jesse Pan, Sunnyvale, CA (US); Sudhakar Bhat, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/460,269

(22) Filed: Dec. 13, 1999

(51) Int. Cl.$^7$ ............................................. G06F 11/00
(52) U.S. Cl. .............................................. 714/40; 714/30
(58) Field of Search ............................ 714/40, 30, 32, 714/34, 35, 15

(56) References Cited

U.S. PATENT DOCUMENTS

| | | | | |
|---|---|---|---|---|
| 3,688,263 A | * | 8/1972 | Balogh, Jr. et al. | 712/227 |
| 4,095,268 A | * | 6/1978 | Kobayashi et al. | 714/34 |
| 5,555,249 A | * | 9/1996 | Hilley et al. | 714/1 |
| 5,678,003 A | * | 10/1997 | Brooks | 710/200 |
| 5,704,033 A | * | 12/1997 | Park | 714/30 |
| 5,740,413 A | * | 4/1998 | Alpert et al. | 712/227 |
| 5,758,059 A | * | 5/1998 | Alexander | 714/30 |
| 5,951,696 A | * | 9/1999 | Naaseh et al. | 714/30 |
| 6,125,416 A | * | 9/2000 | Warren | 710/71 |
| 6,349,397 B1 | * | 2/2002 | Koga et al. | 714/30 |
| 6,356,960 B1 | * | 3/2002 | Jones et al. | 710/5 |

* cited by examiner

*Primary Examiner*—Robert Beausoliel
*Assistant Examiner*—Marc Duncan
(74) *Attorney, Agent, or Firm*—Schwegman, Lundberg, Woessner & Kluth, P.A.

(57) ABSTRACT

Methods and systems of testing a processor are disclosed. A system includes a storage unit, a memory hierarchy, and a processor. The memory hierarchy is coupled to the storage element. The processor is coupled to the memory hierarchy. The processor reads instructions from the memory hierarchy. On a probe mode break, the processor initiates the transfer of original code of the memory hierarchy to the storage unit. Test code is loaded into the memory hierarchy. The test code is executed. The original code is loaded back into the memory hierarchy. Normal execution is resumed.

15 Claims, 3 Drawing Sheets

SYSTEMS AND METHODS FOR TESTING PROCESSORS

FIELD OF THE INVENTION

The present invention is related to testing processors, and more particularly to testing processors utilizing a probe mode.

BACKGROUND INFORMATION

Processors are continually designed with improved speed and capabilities compared to earlier designs. This results in complex processors with ever increasing instruction sets, registers, and caches. As the complexity of processors goes up, the amount of testing and debugging that is performed to maintain a reliable processor increases. This testing and debugging is also performed to improve the speed and efficiency of the processor.

A significant amount of debugging and performance enhancement is done before a processor can successfully be brought on the market. As the amount of debugging needed increases, the time before the finished product can be brought on the market increases. That precious time can be quite long with the current debugging methods.

The current debugging is tedious and time consuming. Testing hardware is usually required and is connected to the processor and puts the processor in a testing mode. Generally, a single instruction is executed and the results of that single execution are analyzed. The result of the execution is then compared to the expected results. For example, if the single instruction was to add "2+2" and put the result in a register and the instruction puts "5" in the register, an error has occurred. If the instruction puts "4" in the register, than an error has not occurred. Care is taken in selecting instructions to test the various aspects of the processor because only a limited number of instructions can feasibly be performed. Also, a user may be required to manually perform the testing and check for errors.

For relatively simple processors, only testing one instruction at a time may be sufficient for testing the processors. However, for more complex processors, only testing only one instruction at a time may not be sufficient to adequately test the processors. To execute more than one instruction or test instruction, each instruction must be loaded, executed and unloaded and then repeated for the next instruction. This "stepping through" can be time consuming for complicated tasks or large number of instructions. Further, additional tasks may need to be performed in between executing each instruction to analyze information and results of executing the instruction.

Analyzing the information or results of an execution of an instruction can also be problematic with the current art of testing. The effect of one execution needs to be analyzed prior to executing another instruction. Furthermore, the current probe modes fail to provide access to all of the system registers and memory. Thus, the results of executing an instruction may not be seen and errors in the processor may not be detected.

The present invention addresses these and other issues associated with testing processors.

SUMMARY OF THE INVENTION

In one embodiment of the invention is a system including a storage unit, a memory hierarchy, and a processor. The memory hierarchy is coupled to the storage unit. The processor is coupled to the memory hierarchy. The processor reads instructions from the memory hierarchy. On a probe mode break, the processor initiates the transfer of original code of the memory hierarchy to the storage unit. Test code is loaded into the memory hierarchy. The test code is executed. The original code is loaded back into the memory hierarchy. Normal execution is resumed.

Other systems and methods are disclosed.

DETAILED DESCRIPTION

In the following detailed description, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Performance and reliability of processors are important to successful computer systems. To design highly reliable processors that can perform fast enough takes considerable time and money. A testing system, such as the probe mode test system, to reduce the time and money required to design a processor can be used.

To test a processor in a computer system, the processor can be brought into a mode or state known as probe mode. Once in this mode, test instructions or code can be executed to test the processor. After testing of the processor is complete, the processor exits probe mode and can resume normal operation.

A probe mode test system can cause a processor to enter probe mode a number of ways. A processor may enter probe mode by having a pin or signal sent to the processor signaling a break and causing the processor to enter probe mode. Alternately, a processor may enter probe mode by executing a break instruction. The break instruction causes the processor to enter probe mode. Probe mode is the state of the system in which testing and debugging instructions are executed and analyzed for performance and reliability. Generally, the testing instructions utilize RTL (register transfer language) to perform the desired testing.

The processor is not required to be in an idle mode or state prior to receive the break signal. The processor may be executing applications and processes as it normally does and may be put into probe mode at any time. On receiving the break signal, the processor saves current state information including instruction pointers so that the processor may resume normal execution subsequent to probe mode.

Figure 1:
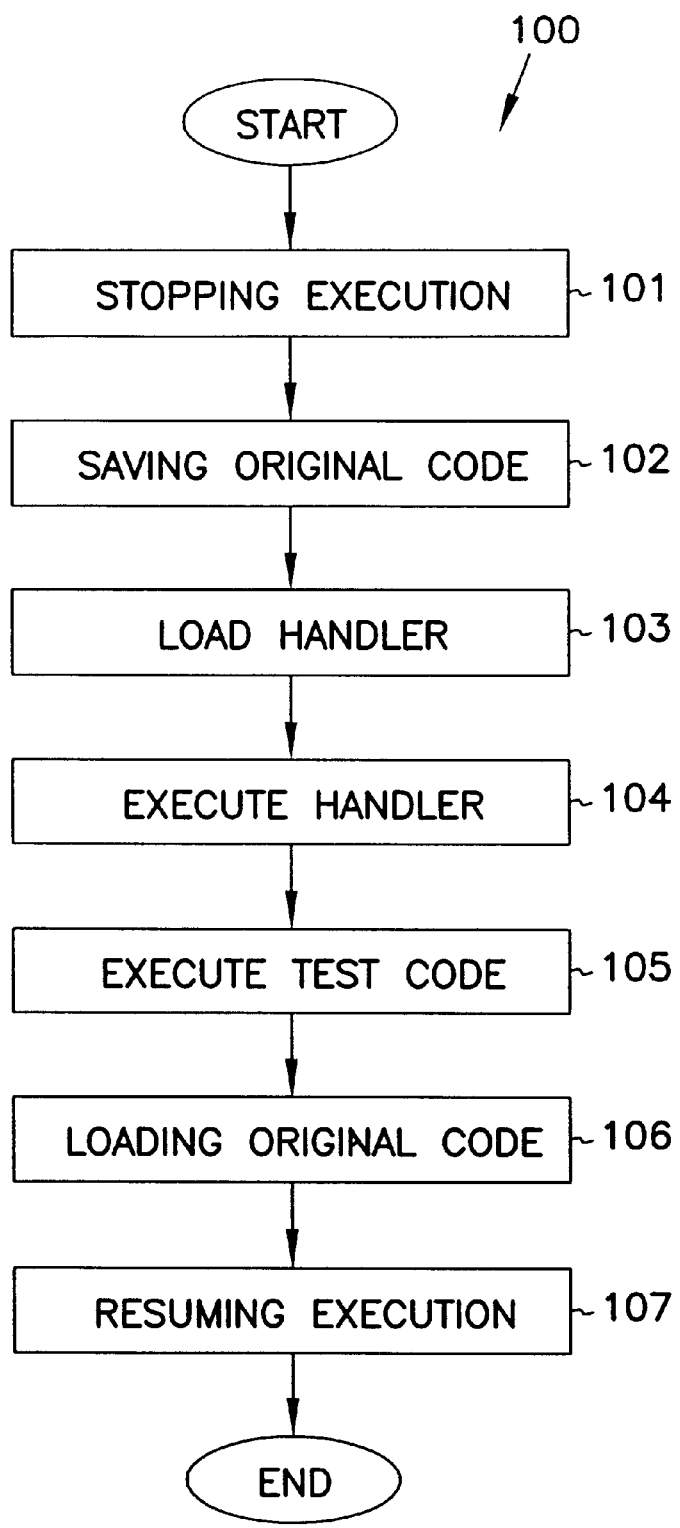
FIG. 1 illustrates a method for testing a processor according to an embodiment of the present invention.

Referring to FIG. 1, a method 100 for testing a processor according to one embodiment of the invention is shown. The processor may be compatible with, but is not limited to, processors such as an Intel® architecture processor, manufactured by Intel Corporation of Santa Clara, Calif., the assignee of the present invention. For this embodiment, the processor a 32 bit instruction set or a 64 bit instruction set. The processor may be pipelined. The processor is part of a computer system that may contain other processors. The processor executes instructions located in an instruction cache.

The execution of the processor is stopped in response to a probe mode break 101. The processor is not required to be in any special mode to receive the probe mode break. The probe mode break can be a break, signal or interrupt. The probe mode break acts similar to a normal interrupt or exception. When normal interrupts occur, execution breaks or transfers to a interrupt handler which is usually located in system memory. However, the probe mode break causes the processor to enter probe mode and causes original code in an instruction cache to be saved 102, a probe mode handler to be loaded into the instruction cache 103 and the probe mode handler is executed. The probe mode break signal can be generated any number of ways such as by asserting a probe mode pin or by setting a breakpoint in an instruction. The original code from the instruction cache can be saved to a storage unit. In another embodiment, a memory hierarchy can be used in place of the instruction cache. The memory hierarchy is any device capable of storing code such as cache, dynamic memory, or virtual memory. The original code is code that was in the instruction cache or memory hierarchy at the time the probe mode break occurred. Additionally, some state information including but not limited to information such as an instruction pointer and register contents is saved. The state information allows resuming normal execution after testing is complete. The storage unit can be any device capable of storing code. For example, the storage unit could be a hard drive or dynamic memory.

The processor runs or executes the probe mode handler 104. The probe mode handler includes code that can be executed to allow access to architectural state information of the processor. The architectural state information generally includes the contents and status of all registers, memories, caches, and busses in the computer system. One way that the probe mode handler may access the state information is by utilizing a control register access bus (CRAB). The CRAB is a special bus that connects to most or all registers and memory and permits access to those components and is separate from other system buses. Thus, the probe mode handler may access most or all state information and may save that information to a second storage location. The second storage location can be located separate from the computer system such as being located in a test system.

The probe mode handler includes test code. The test code is a set of instructions desired to be executed on the processor to test the performance of the processor. The test code may include code written in a register transfer language (RTL). The probe mode handler causes execution of the test code 105. The state information can be monitored as instructions are executed to proved result information. The result information can be used to determine if the processor has committed an error or can be used to measure performance. The result information includes information such as register and memory contents and status that may or may not be modified by the test code. The result information can be compared to expected values to see if an error has occurred. The result information may be saved to the second or third storage location so that it may be analyzed and processed further at a later timer. Further, the result information may be compared to results of other executions of test code to compare the results.

While in probe mode, other processors in the computer system may snoop the processor being tested. This allows the other processors to watch, analyze or control the testing of the processor being tested.

After the test code has been executed, the probe mode handler loads the original code into the instruction cache 106. The probe mode handler may also update registers with the state information required for resuming normal processing. The processor exits probe mode and resumes normal processing 107. Processes that were running or executing on the processor prior to entering probe mode may not even be aware that their execution was interrupted.

In another embodiment, the method for executing code in a processor further includes loading a code loader into the instruction cache. The code loader can be executed during probe mode to allow test code to be executed having a size larger than the size of the instruction cache. The loader permits an almost limitless amount of test code to be execute. This allows even more complicated or complex tests to be run on the processor.

The loader can load the larger amount of test code by swapping executed code with unexecuted code stored at another location.

In another embodiment where the processor is a pipelined processor, the method includes saving instructions or code located in the pipeline and flushing or stalling the pipeline prior to entering probe mode. Generally, a pipeline has a number of stages and each stage can contain an instruction or other information. A flush causes a number of stages of the pipeline to be flushed. The range of stages to be flushed are designated in a flush signal and only those stages are flushed or emptied. For example a flush signal to flush stages 1–3 of a 5 stage pipeline would flush stages or latches 1–3 and leave the 4–5 stages as they were. A stall is similar to a flush and causes a number of stages of a pipeline to be stalled. A stall signal specifies a range of stages to be stalled and only those stages are stalled. The contents of the stalled stages remain the same until the stall signal is ended or another signal signals that the stall is over. While in probe mode, the test code can be inserted into the pipeline at an appropriate stage and executed. On exiting probe mode, flushed stages can have their original code or information inserted and stalled stages can be released to allow normal execution to resume.

Figure 2:
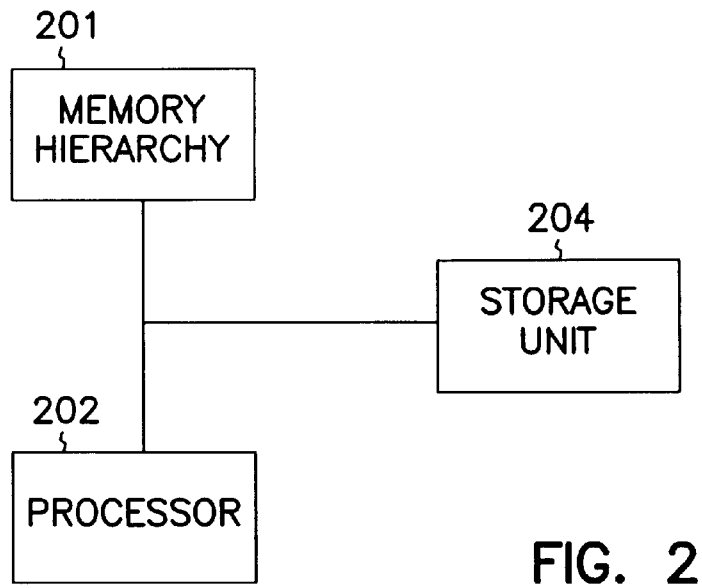
FIG. 2 illustrates a system for testing a processor according to one embodiment of the present invention.

Referring to FIG. 2, a system according to an embodiment of the invention is shown. The system includes a memory hierarchy 201, a processor 202, and a storage unit 204. The system permits testing of the processor 202. The memory hierarchy 201 can be an amount of dynamic ram, cache memory, a linear array, or virtual memory. The memory hierarchy 201 holds instructions that the processor 202 executes. The memory hierarchy 201 along with the processor 202 are part of a computer system.

The storage unit 204 is a device or unit capable of storing code and is coupled to the memory hierarchy. For example, it could be hard drive space, system memory, off-chip cache or an external memory. The storage unit may be located within the computer system the processor 202 is within or the storage unit may be located external to the computer system.

The processor 202 is coupled to the memory hierarchy 201. The processor 202 is not limited to one type or brand of processor. The processor can be any processor including but not limited to processors such as an Intel® architecture processor, manufactured by Intel Corporation of Santa Clara, Calif., the assignee of the present invention. Further, the processor is not limited to a certain instruction set. For one example, the processor 202 can use 32 bit instructions or 64 bit instructions or both. The processor 202 reads code from the memory hierarchy 201 and executes that code. In this embodiment, the processor 202 is a pipelined processor. Other similar embodiments can include non-pipelined processors. For this embodiment, the pipeline of the processor can be an in-order or out-of-order type pipeline. Other embodiments may include other types of pipelines.

As stated earlier, the processor 202 is part of a computer system. There may also be other processors in the computer system.

To perform testing or to execute code on the processor 202 in this embodiment, the processor 202 is brought into probe mode. Prior to entering probe mode, the processor 202 can be operating normally. To enter probe mode, a probe mode break or signal is generated. The break can be generated a number of ways. The break can be generated by the processor encountering a break instruction or by a hardware event such as connecting to a certain pin of the processor.

On receiving the probe mode break or signal, the current processes executing on the processor 202 are stopped or halted. The pipeline of the processor 202 is stalled or flushed as needed and the contents of the stages that are flushed are saved to the storage unit 204. The contents of the memory hierarchy 201, the original code, are also saved to the storage unit 204. Further, minimal state information is saved to the storage unit 204. The minimal state information is the information necessary to resume execution of the processes that were stopped or halted. The minimal state information can include information such as instruction pointers. After this current information, which includes the contents of the flushed stages, the original code, and the minimal state information, is saved, a probe mode handler is loaded into the memory hierarchy 201. The probe mode handler can be loaded from another device such as system memory, a separate computer system, or some other type of peripheral device.

The probe mode break operates similar to other interrupts or breaks that occur in a computer system. However, the probe mode break causes the processor 202 to execute the probe mode handler located in the memory hierarchy 201 unlike other interrupts or breaks that point to locations and handlers in system memory.

The probe mode handler can be generated by a user to perform desired tests or access desired information. The probe mode handler includes a set of test code. Most or all of the state information such as registers can be accessed and transferred to the storage unit 204 or other devices. The set of test code is executed by the processor 202.

The set of test code is code that a user generated to test various aspects of the processor 202. The set of test code can utilize high level programming such as loops, branches and nested loops. The set of test code can also be called a kernel or probe mode kernel.

The state information can be accessed by the probe mode handler even while test code is running. This permits watching or examining the results of executing each test code instruction.

A way to access the state information is by utilizing a control register access bus (CRAB). The CRAB permits access to most or all registers in the processor and to other components of the system. The CRAB is separate from other system busses and may access contents and status of registers and other components of the computer system without interrupting processing.

After the set of test code has completed being executed, the processor 202 exits probe mode. Probe mode is exited by reloading the memory hierarchy 201 with the original code, reinserting contents of previously flushed stages with their original information, and resuming execution of processes that were stopped or halted. The minimal state information may be utilized to resume execution.

Figure 3:
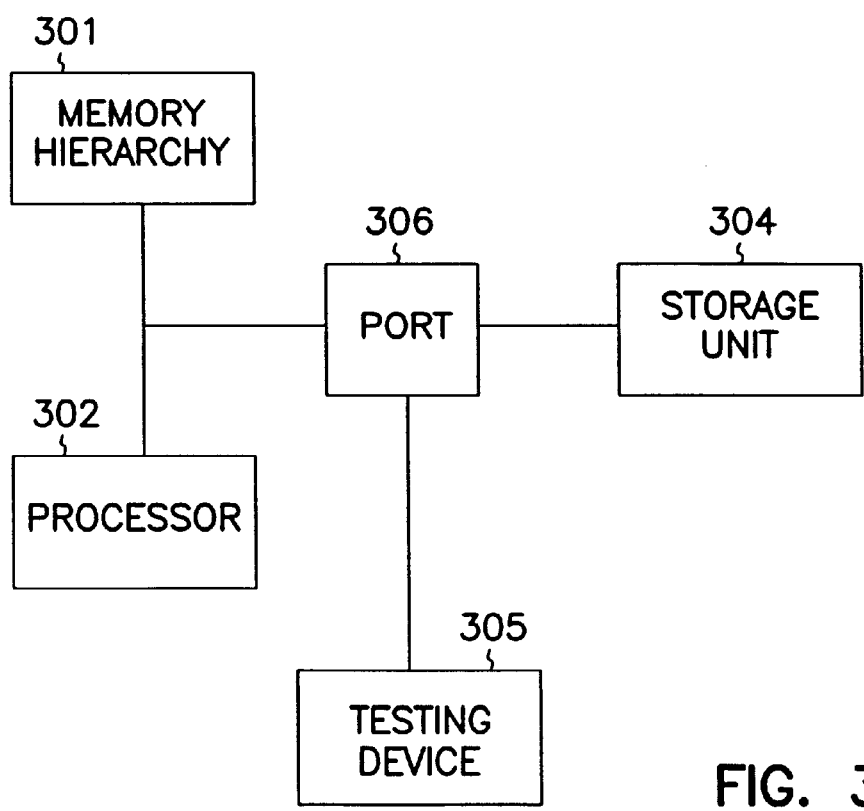
FIG. 3 illustrates a system for testing a processor according to one embodiment of the present invention.

Referring to FIG. 3, a system according to an embodiment of the invention is shown. The system includes a memory hierarchy 301, a processor 302, a storage unit 304, a testing device 305 and a terminal access port 306. The system permits testing of the processor 302. The memory hierarchy 301 can be an amount of dynamic ram, cache memory, a linear array, or virtual memory. The memory hierarchy 301 holds instructions that the processor 302 executes. The memory hierarchy 301 along with the processor 302 are part of a computer system.

The storage unit 304 is a device or unit capable of storing code and is coupled to the terminal access port 306. For example, it could be hard drive space, system memory, off-chip cache or an external memory. The storage unit may be physically located within the computer system the processor 302 is within or the storage unit may be located external to the computer system.

The processor 302 is coupled to the memory hierarchy 301. The processor 302 is not limited to one type or brand of processor. The processor can be any processor including but not limited to processors such as an Intel® architecture processor, manufactured by Intel Corporation of Santa Clara, Calif., the assignee of the present invention. Further, the processor is not limited to a certain instruction set. For one example, the processor 302 can use 32 bit instructions or 64 bit instructions or both. The processor 302 reads code from the memory hierarchy 301 and executes that code. In this embodiment, the processor 302 is a pipelined processor. Other similar embodiments can include non-pipelined processors. For this embodiment, the pipeline of the processor can be an in-order or out-of-order type pipeline. Other embodiments may include other types of pipelines.

The terminal access port 306 is coupled to the memory hierarchy 301, the processor 302, the storage unit 304 and the testing device 305. Generally, the terminal access port provides an interface between the testing device 305 and the memory hierarchy 301, the processor 302 and the storage unit 304. For example, the terminal access port 306 can be a serial interface or a universal serial bus (USB) interface.

The testing device 305 is coupled to the terminal access port 306 and may also be coupled to the storage unit 304. The testing device 305 is physically located external to the processor 302 and the computer system. The testing device is responsible for performing and controls the testing of the processor 302. The testing device 305 generates the probe mode break to enter testing and may generate test code to be used it testing. Further, the testing device may save and analyze results of testing the processor 302. The testing device 305 can be another computer system or some other electronic device.

To perform testing or to execute code on the processor 302 in this embodiment, the processor 302 is brought into probe mode. Prior to entering probe mode, the processor 302 can be operating normally. To enter probe mode, a probe mode break or signal is generated. The break can be generated a number of ways. The break can be generated by the processor encountering a break instruction or by a hardware event such as the testing device 305 sending a signal or asserting a pin on the processor 302.

On receiving the probe mode break or signal, the current processes executing on the processor 302 are stopped or halted. The pipeline of the processor 302 is stalled or flushed as needed and the contents of the stages that are flushed are saved to the storage unit 304. The contents of the memory hierarchy 301, the original code, are also saved to the storage unit 304 through the terminal access port 306. Further, minimal state information is saved to the storage unit 304 through the terminal access port 306. The minimal state information is the information necessary to resume execution of the processes that were stopped or halted. The minimal state information can include information such as instruction pointers. After this current information, which includes the contents of the flushed stages, the original code, and the minimal state information, is saved, a probe mode handler is loaded into the memory hierarchy 301. The probe mode handler is loaded from the testing device 305. If the pipeline of the processor has been stalled, it may be released to allow the probe mode handler to be executed.

The probe mode break operates similar to other interrupts or breaks that occur in a computer system. However, the probe mode break causes the processor 302 to execute the probe mode handler located in the memory hierarchy 301 unlike other interrupts or breaks that point to locations and handlers in system memory.

The probe mode handler is generated by the testing device to perform desired tests or access desired information. The probe mode handler includes a set of test code. Most or all of the state information such as registers can be accessed and transferred to the storage unit 304 or the testing device. The set of test code is executed by the processor 302.

The set of test code is code that may be user generated to test various aspects of the processor 302. The set of test code can utilize high level programming such as loops, branches and nested loops. The set of test code can also be called a kernel or probe mode kernel.

The state information can be accessed by the probe mode handler even while test code is running. This permits watching or examining the results of executing each test code instruction.

A way to access the state information is by utilizing a control register access bus (CRAB). The CRAB permits access to most or all registers in the processor and to other components of the system. The CRAB is separate from other system busses and may access contents and status of registers and other components of the computer system without interrupting processing. The terminal access port may be coupled to the CRAB to allow the testing device to access the state information.

After the set of test code has completed being executed, the processor 302 exits probe mode. Probe mode is exited by stalling the pipeline of the processor 302, reloading the memory hierarchy 301 with the original code, reinserting contents of previously flushed stages with their original information, releasing the stalled pipeline and resuming execution of processes that were stopped or halted. The minimal state information may be utilized to resume execution.

Figure 4:
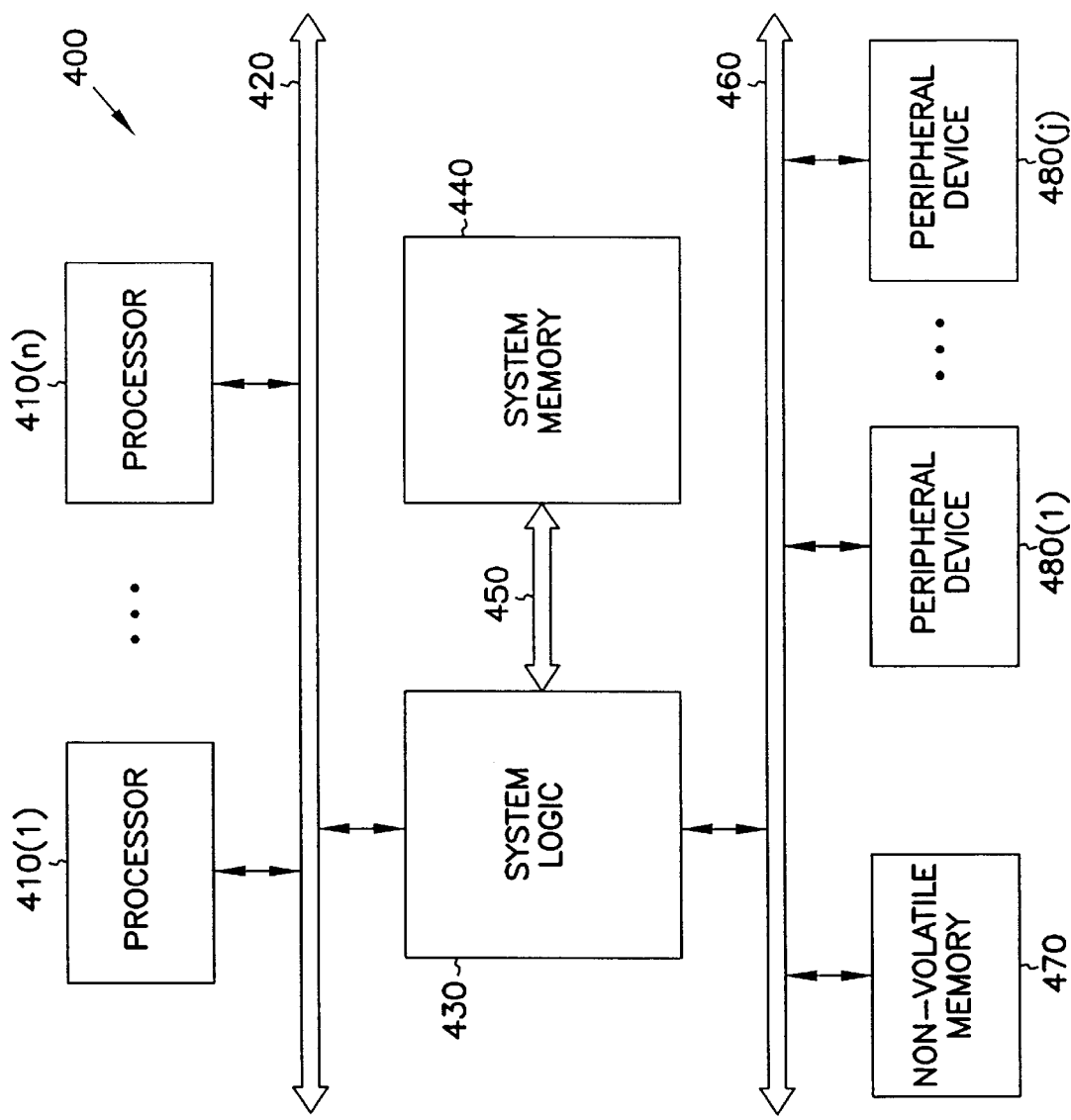
FIG. 4 illustrates a computer system suitable for implementing the present invention.

FIG. 4 is a block diagram of one embodiment of a computer system 400 that is suitable for implementing the present invention. The disclosed embodiment of computer system 400 includes a plurality of processors 410 that are coupled to system logic 430 through a processor bus 420. A system memory 440 is coupled to system logic 120 through bus 450. A non-volatile memory 470 and one or more peripheral devices 480(1)–480(j) (collectively, devices 480) are coupled to system logic 430 through peripheral bus 460. Peripheral bus 460 represents, for example, one or more peripheral component interconnect (PCI) buses, industry standard architecture (ISA) buses, extended ISA (EISA) buses, and comparable peripheral buses. Non-volatile memory 470 may be a static memory device such as a read only memory (ROM) or flash memory. Peripheral devices 480 include, for example, a keyboard, mouse or other pointing devices, mass storage devices such as hard drives and digital video discs (DVD), a display, and the like. These devices, together with system logic 430 define the computing platform for system 400.

For the disclosed embodiment of system 400, processors 410 may execute code or routines stored in system memory 440. The processor also executes code from the non-volatile memory 470. Additionally, the processor may execute code from an instruction cache.

The various embodiments permit fast and comprehensive testing of processors. Instead of executing one instruction at a time, high level programming including loops and procedures may be used. The embodiments allows access to architectural state information. Furthermore, test data or result information from testing can be generated and transferred from the system having the processor being tested and that test data can be transferred fast by using an interface. Overall, reliable processors may be brought to market faster by utilizing the various embodiments and any adaptations or variations of the present invention.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A system comprising:

a storage unit;

a memory hierarchy coupled to the storage unit;

a processor coupled to the memory hierarchy, wherein the processor reads instructions from the memory hierarchy; wherein on a probe mode break, the processor initiates the transfer of original code of the memory hierarchy to the storage unit, loads test code into the memory hierarchy, executes the test code, and loads the original code of the memory hierarchy back into the memory hierarchy at which point normal execution resumes;

a port coupled to the processor, the storage unit and, the memory hierarchy, wherein the port is a universal serial bus interface;

a testing device coupled to the port.

2. A system comprising:

a storage unit;

a memory hierarchy coupled to the storage unit;

a processor coupled to the memory hierarchy, wherein the processor reads instructions from the memory hierarchy, wherein on a probe mode break, the processor initiates the transfer of original code of the memory hierarchy to the storage unit, loads a probe mode handler into the memory hierarchy, executes the probe mode handler, and loads the original code of the memory hierarchy back into the memory hierarchy, at which point normal execution resumes, wherein the probe mode handler includes test code for testing the processor and a loader for loading code beyond a size of the memory hierarchy.

3. The system of claim 2, wherein the probe mode break is generated by a break instruction.

4. The system of claim 2, wherein the probe mode break is generated by asserting a pin of the processor.

5. A system comprising:
a storage unit;
a memory hierarchy coupled to the storage unit;
a processor coupled to the memory hierarchy, wherein the processor reads instructions from the memory hierarchy; wherein on a probe mode break, the processor initiates the transfer of original code of the memory hierarchy to the storage unit, loads a probe mode handler into the memory hierarchy, executes the probe mode handler, and loads the original code of the memory hierarchy back into the memory hierarchy at which point normal execution resumes,
wherein the probe mode break is generated by asserting a pin of the processor and wherein the probe mode handler is loaded into the memory hierarchy from the storage unit.

6. The system of claim 5, wherein the processor further comprises a plurality of registers and wherein the probe mode handler accesses the status and content of the plurality of registers.

7. A system comprising:
a storage unit;
a memory hierarchy coupled to the storage unit;
a processor coupled to the memory hierarchy, wherein the processor reads instructions from the memory hierarchy; wherein on a probe mode break, the processor initiates the transfer of original code of the memory hierarchy to the storage unit, loads a probe mode handler into the memory hierarchy, executes the probe mode handler, and loads the original code of the memory hierarchy back into the memory hierarchy, at which point normal execution resumes;
a port coupled to the processor, storage unit and memory hierarchy; and
a testing device coupled to the port,
wherein the probe mode handler is loaded into the memory hierarchy from the testing device, through the port to the memory hierarchy and wherein the testing device generates the probe mode break.

8. The system of claim 7, wherein the testing device is a computer and wherein the testing device generates the probe mode handler.

9. The system of claim 7, wherein the probe mode handler includes test code for testing the processor.

10. The system of claim 7, wherein the processor further comprises a plurality of registers and wherein the probe mode handler accesses the status and content of the plurality of registers.

11. The system of claim 7, wherein the probe mode break is generated by asserting a pin of the processor.

12. A method for testing a processor comprising:
stopping normal execution in the processor in response to a probe mode break;
copying original code from a memory hierarchy to a storage unit;
loading the memory hierarchy with test code;
executing the test code, including replacing executed test code with additional test code and executing the additional test code;
loading the memory hierarchy with the original code; and
resuming normal execution.

13. The method of claim 12, wherein the probe mode break is generated by asserting an external pin.

14. The method of claim 12, further comprising accessing content and status of at least one register and system memory.

15. The method of claim 12, wherein executing the test code includes executing a plurality of instructions.

* * * * *

UNITED STATES PATENT AND TRADEMARK OFFICE
CERTIFICATE OF CORRECTION

PATENT NO. : 6,571,359 B1
DATED : May 27, 2003
INVENTOR(S) : Kiran A. Padwekar, Jesse Pan and Sudhakar Bhat It is certified that error appears in the above-identified patent and that said Letters Patent is hereby corrected as shown below:

<u>Column 8,</u>
Line 47, delete "," after "and".

Signed and Sealed this

Twenty-eighth Day of October, 2003

JAMES E. ROGAN
*Director of the United States Patent and Trademark Office*